US010642081B2

(12) United States Patent
Song et al.

(10) Patent No.: US 10,642,081 B2
(45) Date of Patent: May 5, 2020

(54) ELASTIC FIXING MEMBER FOR FIXING LIGHT GUIDE PLATE, CORRESPONDING BACKPLANE AND LIQUID CRYSTAL DISPLAY DEVICE COMPRISING BOTH

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Suimang Song, Beijing (CN); Liang Li, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 15/755,998

(22) PCT Filed: Sep. 28, 2017

(86) PCT No.: PCT/CN2017/103965
§ 371 (c)(1),
(2) Date: Feb. 27, 2018

(87) PCT Pub. No.: WO2018/171159
PCT Pub. Date: Sep. 27, 2018

(65) Prior Publication Data
US 2018/0341144 A1 Nov. 29, 2018

(30) Foreign Application Priority Data
Mar. 22, 2017 (CN) .................. 2017 2 0282116 U

(51) Int. Cl.
G02F 1/1333 (2006.01)
G02F 1/1335 (2006.01)
(Continued)

(52) U.S. Cl.
CPC ..... G02F 1/133308 (2013.01); G02B 6/0088 (2013.01); G02F 1/133524 (2013.01); G02F 1/133615 (2013.01); G02F 2001/133314 (2013.01); G02F 2201/46 (2013.01); G02F 2201/465 (2013.01)

(58) Field of Classification Search
CPC .................................................... G02F 1/1333
See application file for complete search history.

(56) References Cited

U.S. PATENT DOCUMENTS 5,808,707 A * 9/1998 Niibori ............. G02F 1/133308
349/150
6,411,353 B1 * 6/2002 Yarita ............... G02F 1/133308
349/150

(Continued)

FOREIGN PATENT DOCUMENTS

CN 202338865 U 7/2012
CN 202791844 U 3/2013

(Continued)

OTHER PUBLICATIONS

International Search Report received for PCT Patent Application No. PCT/CN2017/103965, dated Nov. 27, 2017, 8 pages (3 pages of English Translation and 5 pages of Original Document).

Primary Examiner — Sang V Nguyen
(74) Attorney, Agent, or Firm — Womble Bond Dickinson (US) LLP

(57) ABSTRACT

The present disclosure relates to the technical field of fixation of light guide plates, and in particular discloses an elastic fixing member for fixing a light guide plate, a backplane for use in conjunction therewith, and a liquid crystal display device comprising both. The elastic fixing (Continued)

member comprises: a body part and a self-fixation part, wherein the self-fixation part is configured to fix the elastic fixing member on a backplane in use. Correspondingly, the backplane comprises: a base and a side wall. Furthermore, a fixing structure and a mounting guide structure are arranged on the side wall of the backplane. The fixing structure is configured to maintain the fixation of the elastic fixing member on the backplane together with the self-fixation part of the elastic fixing member in use, and the mounting guide structure is configured to guide the elastic fixing member in use to fix it on the backplane.

9 Claims, 3 Drawing Sheets

(51) Int. Cl.
  *F21V 8/00* (2006.01)
  *G02F 1/13357* (2006.01)

(56) References Cited

U.S. PATENT DOCUMENTS

| | | | | |
|---|---|---|---|---|
| 2006/0171171 A1* | 8/2006 | Chiang | G02B 6/0088 | 362/633 |
| 2010/0188599 A1 | 7/2010 | Arihara | | |
| 2010/0296310 A1* | 11/2010 | Jeong | G02B 6/0088 | 362/606 |
| 2012/0140149 A1* | 6/2012 | Sakita | G02F 1/133603 | 349/67 |
| 2013/0135555 A1* | 5/2013 | Chen | B29C 70/745 | 349/60 |
| 2013/0250213 A1* | 9/2013 | Tomomasa | G02B 6/0078 | 349/65 |
| 2014/0043560 A1* | 2/2014 | Jang | H05K 5/02 | 349/58 |
| 2016/0091658 A1* | 3/2016 | Wu | G02B 6/0088 | 362/615 |
| 2017/0038525 A1* | 2/2017 | Meng | G02B 6/0088 | |
| 2017/0160464 A1* | 6/2017 | Choi | G02B 6/0088 | |

FOREIGN PATENT DOCUMENTS

| | | | | |
|---|---|---|---|---|
| CN | 202835045 | * | 3/2013 | G02F 1/1335 |
| CN | 202835045 U | | 3/2013 | |
| CN | 203745770 | * | 7/2014 | G02F 1/1333 |
| CN | 203745770 U | | 7/2014 | |
| CN | 204084047 U | | 1/2015 | |
| CN | 105674145 A | | 6/2016 | |
| JP | 2010-153252 A | | 7/2010 | |

* cited by examiner

ELASTIC FIXING MEMBER FOR FIXING LIGHT GUIDE PLATE, CORRESPONDING BACKPLANE AND LIQUID CRYSTAL DISPLAY DEVICE COMPRISING BOTH

CROSS REFERENCE TO RELATED APPLICATIONS

The present application is the U.S. national phase entry of PCT/CN2017/103965, with an international filing date of Sep. 28, 2017, which claims the priority of the Chinese application for utility model No. 201720282116.8 filed on Mar. 22, 2017, the entire disclosures of both are incorporated herein by reference.

TECHNICAL FIELD

The present disclosure relates to the technical field of fixation of light guide plates, and in particular discloses an elastic fixing member for fixing a light guide plate, a backplane for use in conjunction therewith, and a liquid crystal display device comprising the elastic fixing member and the backplane.

BACKGROUND ART

With the rapid popularity of automobile industry, especially the wide use of domestic automobiles, requirements for in-vehicle displays have come higher and higher. In particular, in-vehicle displays have gradually developed from traditional pointer-type of displays into LCD displays having a digital image display function. Complicated mechanical and electrical structures of the automobiles per se and the corresponding use environments all pose higher technical requirements for liquid crystal display modules. Therefore, how to achieve an optimal design for the backlight module plays a crucial role in the wide application of display techniques in technical fields such as transportation by vehicle, by sea and by air.

In the backlight module of an existing in-vehicle display, the light guide plate is usually fixed by rubber blocks. However, rubber blocks are relatively less operable in terms of assembly. In view of this, existing fixing structures for light guide plates generally achieve fixation by means of tapes. However, since tapes have difficulties in assembling and reworking, in an existing technical solution using tapes to fix a light guide plate, a high accuracy and high reliability of fixation can be hardly ensured, and the labor cost for the fixation process is often higher.

SUMMARY

To this end, embodiments of the present disclosure provide an elastic fixing member for fixing a light guide plate, a backplane for use in conjunction therewith, and a liquid crystal display device comprising the elastic fixing member and the backplane, so as to alleviate or eliminate one or more of the above mentioned shortcomings or deficiencies.

According to one aspect, an elastic fixing member for fixing a light guide plate is provided in an embodiment of the present disclosure. Specifically, the elastic fixing member comprises: a body part and a self-fixation part, wherein the self-fixation part is configured to fix the elastic fixing member on a corresponding backplane in use. With the elastic fixing member provided in the embodiment, fixation of the light guide plate on the corresponding backplane is facilitated. Specifically, on one hand, the light guide plate is securely fixed on the backplane by means of the body part of the elastic fixing member; and on the other hand, the elastic fixing member per se is fixed on the corresponding backplane by means of the self-fixation part of the elastic fixing member. As can be seen, the elastic fixing member provided according to an embodiment of the present disclosure facilitates highly stable fixation of the light guide plate and of the elastic fixing member per se as well.

According to a specific embodiment, in the elastic fixing member for fixing a light guide plate provided in the above embodiment, the body part is in a curved shape. In this way, the elastic fixing member will be arranged close to corners of the light guide plate when it is used to fix the light guide plate. In other words, the elastic fixing member is attached with the body part thereof to corners of the light guide plate, for example, to the four corners of the light guide plate respectively. Alternatively, according to another specific embodiment, the body part of the elastic fixing member is in a straight shape, instead of a curved shape. In this case, the elastic fixing member will be arranged along a side edge of the light guide plate when it is used to fix the light guide plate. That is, the elastic fixing member is attached with the body part thereof to a side edge of the light guide plate. With the above special shape of the elastic fixing member, the effect of fixing the light guide plate by the elastic fixing member is enhanced, and thereby highly stable fixation of the light guide plate is achieved.

According to a further specific embodiment, in the elastic fixing member provided by the present disclosure, the self-fixation part comprises: a rod and a cap. Further specifically, the cap of the self-fixation part is arranged at one end of the rod. Moreover, at the other end of the rod, i.e., the end opposite the cap, the rod of the self-fixation part is connected to the body part of the elastic fixing member. According to this specific embodiment, the self-fixation part of the elastic fixing member can be designed in a bolt-like shape. In other words, the self-fixation part comprises a trunk and a cap arranged at one end of the trunk. In this way, the self-fixation of the elastic fixing member per se on the corresponding backplane is facilitated. Thereby, the fixation effect of the light guide plate by means of the elastic fixing member is further enhanced, because the elastic fixing member per se has been secured onto the corresponding backplane.

As an exemplary implementation, the elastic fixing member disclosed in the above embodiments can be formed from a rubber material. Obviously, benefiting from the teaching of the present disclosure, one having ordinary skills in the art can easily conceive of various usable elastic materials such as resin, and the present disclosure is not limited to only the rubber material listed above as an example. Furthermore, the elastic fixing member for fixing a light guide plate disclosed above can be formed by an injection molding process. Due to the injection molding process, the elastic fixing member according to the present disclosure has advantages such as easy assembly, low cost, and batch automation. Likewise, those skilled in the art can easily conceive of various feasible processes for forming the elastic fixing member, and the present disclosure is not limited to only the injection molding process listed above.

According to another aspect, in one embodiment of the present disclosure, a backplane for use in conjunction with the elastic fixing member according to any of the above embodiments is provided. Specifically, the backplane comprises: a base and a side wall, wherein a fixing structure and a mounting guide structure are further arranged on the side wall. The fixing structure is configured to maintain the fixation of the elastic fixing member on the backplane in use together with the self-fixation part of the elastic fixing member. Furthermore, the mounting guide structure is configured to guide the elastic fixing member in use so as to fix it on the backplane.

According to a specific embodiment, in the backplane provided by the above embodiment, the fixing structure comprises a first hole structure penetrating through the side wall of the backplane, and the mounting guide structure comprises a second hole structure penetrating through the side wall of the backplane. Furthermore, the second hole structure is in communication with the first hole structure, and the second hole structure is open at the top of the side wall of the backplane. As a further optional example, an aperture of the second hole structure is further configured to be greater than that of the first hole structure. The special design of the first hole structure and the second hole structure not only facilitates the mounting of the elastic fixing member onto the backplane, but also fixes the elastic fixing member securely on the backplane by means of the first hole structure and the self-fixation part of the elastic fixing member.

According to yet another aspect, a liquid crystal display device is provided in an embodiment of the present disclosure. Specifically, the liquid crystal display device comprises: a light guide plate; the elastic fixing member according to any of the above embodiments; and the backplane according to any of the above embodiments. By incorporating into the liquid crystal display device the elastic fixing member according to any of the above embodiments and the corresponding backplane, the secure fixation of the light guide plate on the backplane by means of the elastic fixing member is facilitated. Moreover, the elastic fixing member has advantages such as high accuracy, high reliability and low cost, and the design thereof is comparatively easy. This facilitates the application of backlight modules comprising the elastic fixing member in many technical fields, especially in fields like transportation by vehicle and transportation by sea.

Of course, similar to the case described above for the elastic fixing member, as a further specific example, the body part of the elastic fixing member is in a curved shape and arranged close to corners of the light guide plate in use Alternatively, the body part of the elastic fixing member is in a straight shape and arranged along a side edge of the light guide plate in use. Further optionally, the self-fixation part of the elastic fixing member comprises: a rod and a cap. In particular, the cap is arranged at one end of the rod, and at the other end of the rod opposite to the cap, the rod is connected to the body part of the elastic fixing member. As a specific example, the elastic fixing member is formed from a rubber material, and further specifically, by an injection molding process.

Likewise, similar to the case described above for the backplane, as a further optional example, the fixing structure of the backplane comprises a first hole structure penetrating through the side wall of the backplane, and the mounting guide structure comprises a second hole structure penetrating through the side wall of the backplane. Specifically, the second hole structure is in communication with the first hole structure, and is open at the top of the side wall of the backplane. Further optionally, an aperture of the second hole structure is further configured to be greater than that of the first hole structure.

Embodiments of the present disclosure disclose an elastic fixing member for fixing a light guide plate, a backplane for use in conjunction therewith, and a liquid crystal display device comprising the elastic fixing member and the backplane. Specifically, the elastic fixing member comprises: a body part and a self-fixation part. Correspondingly, the backplane comprises: a base and a side wall, wherein a fixing structure and a mounting guide structure are further arranged on the side wall. In use, the fixing structure on the side wall of the backplane and the self-fixation part of the elastic fixing member cooperate with each other, thereby maintaining fixation of the elastic fixing member on the backplane. Furthermore, the mounting guide structure is further configured to guide the elastic fixing member in use so as to fix it on the backplane. With the special structure of the elastic fixing member and the corresponding backplane, the light guide plate is fixed on the backplane in a highly reliable manner.

DETAILED DESCRIPTION OF THE EMBODIMENTS

Figure 1:
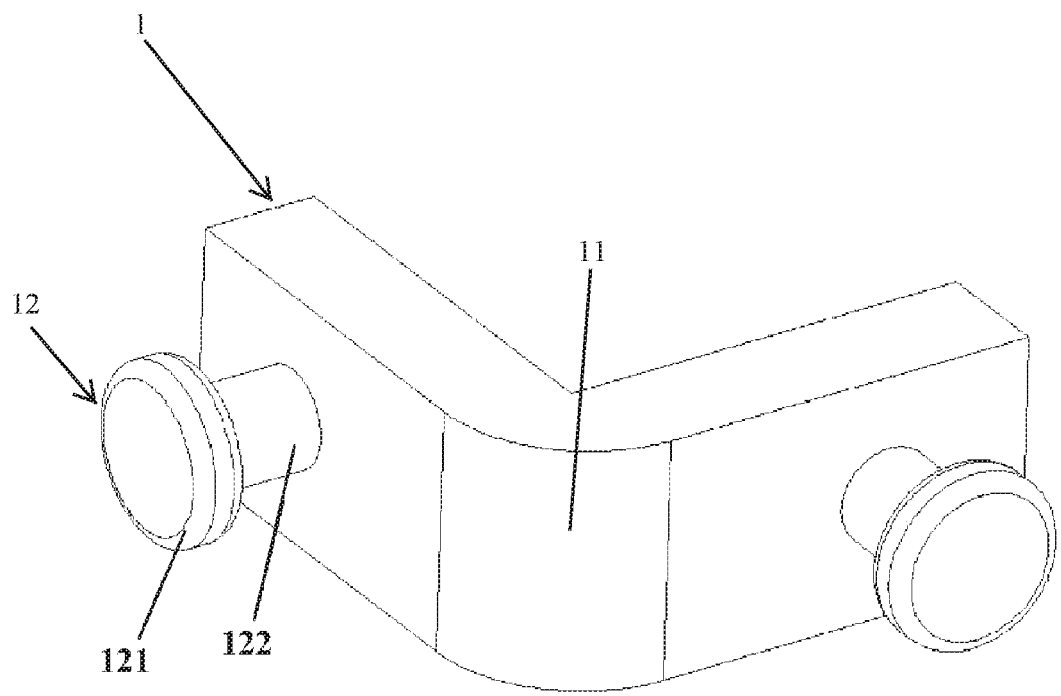
FIG. 1 is a schematic stereo view of an elastic fixing member for fixing a light guide plate according to an embodiment of the present disclosure.

The elastic fixing member, the backplane and the corresponding liquid crystal display device provided by embodiments of the present disclosure will be described below in detail with reference to the drawings. It should be pointed out that the drawings are not necessarily drawn to scale. On the contrary, we will generally focus on illustrating principles of the present disclosure. Therefore, dimensions and positions of each element or component in the drawings do not represent true dimensions or positions. Instead, they are only provided for facilitating implementation of the present disclosure and understanding of the principles.

Referring to FIG. 1, a schematic stereo view of an elastic fixing member for fixing a light guide plate according to an embodiment of the present disclosure is shown. Specifically, as shown in FIG. 1, the elastic fixing member 1 for fixing a light guide plate can comprise a body part 11 and a self-fixation part 12, wherein the self-fixation part 12 can be configured to fix the elastic fixing member 1 on a corresponding backplane (see FIG. 2 below) in use. Specifically, the elastic fixing member 1 can be in a curved shape, for example, an L-shaped elastic fixing member 1 as shown in FIG. 1. Besides, referring to FIG. 1, the self-fixation part 12 can comprise a rod 121 and a cap 122. Furthermore, as can be seen from FIG. 1, the cap 122 of the self-fixation part 12 can be specifically arranged at one end of the rod 121, for example, at an external end as shown in FIG. 1. Moreover, at the other end of the rod 121, i.e., an internal end opposite to the cap 122, the rod 121 of the self-fixation part 12 can be connected to the body part 11 of the elastic fixing member 1. According to the specific embodiment, the self-fixation part 12 of the elastic fixing member 1 can be designed in a bolt-like shape. In other words, the self-fixation part 12 can comprise a trunk and a cap arranged at one end of the trunk.

Figure 2:
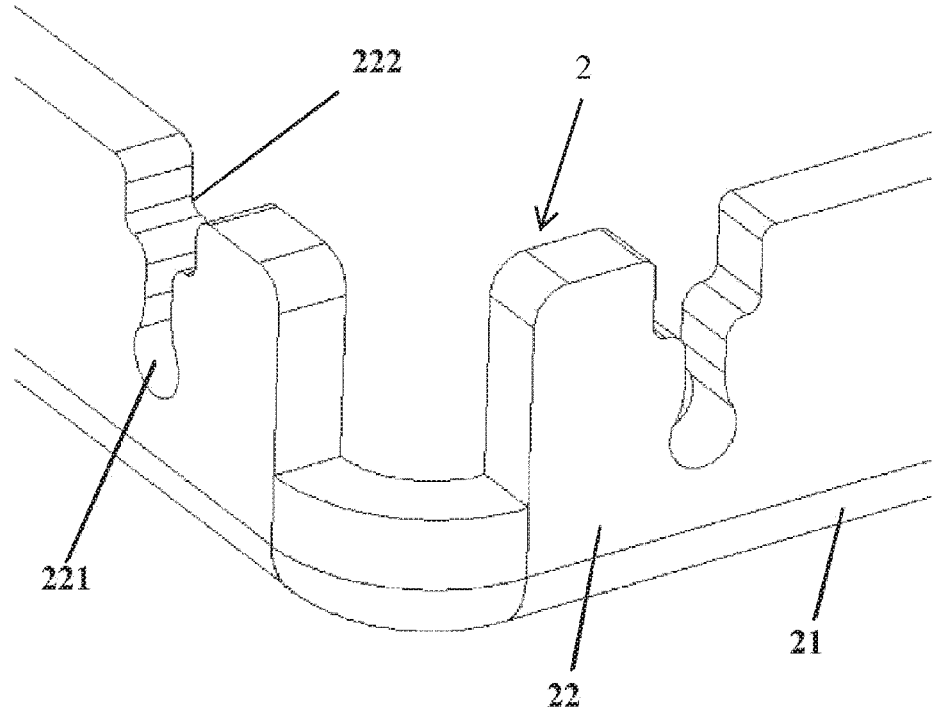
FIG. 2 is a schematic stereo view of a backplane for use in conjunction with the elastic fixing member shown in FIG. 1 according to an embodiment of the present disclosure.

Referring to FIG. 2, a schematic stereo view of a backplane for use in conjunction with the elastic fixing member shown in FIG. 1 according to an embodiment of the present disclosure is illustrated. Specifically, the backplane 2 can comprise a base 21 and a side wall 22, wherein a fixing structure 221 and a mounting guide structure 222 can be further arranged on the side wall 22. In particular, the fixing structure 221 can be configured to maintain the fixation of the elastic fixing member 1 on the corresponding backplane 2 in use together with the self-fixation part 12 of the elastic fixing member 1. Furthermore, the mounting guide structure 222 can be configured to guide the elastic fixing member 1 in use so as to fix it on the corresponding backplane 2.

In a specific example, as shown in FIG. 2, in the backplane 2 for use in conjunction with the elastic fixing member 1, the fixing structure 221 can comprise a first hole structure penetrating through the side wall 22 of the backplane 2, and the mounting guide structure 222 can comprise a second hole structure penetrating through the side wall 22 of the backplane 2. Further optionally, the second hole structure is in communication with the first hole structure, and the second hole structure is open at the top of the side wall 22 of the backplane 2. In an optional example, an aperture of the second hole structure can be further configured to be greater than that of the first hole structure.

Figure 3:
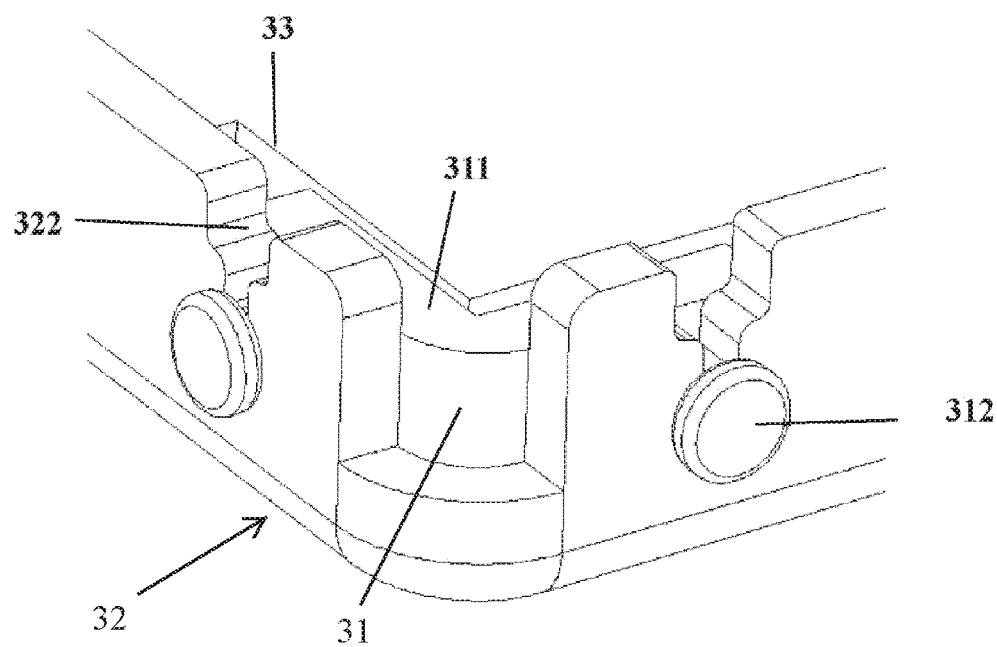
FIG. 3 is a schematic stereo view of the elastic fixing member shown in FIG. 1 and the backplane shown in FIG. 2 after being assembled according to an embodiment of the present disclosure.

FIG. 3 is a schematic stereo view of the elastic fixing member shown in FIG. 1 and the backplane shown in FIG. 2 after being assembled according to an embodiment of the present disclosure, wherein a light guide plate to be fixed by the elastic fixing member is also shown. Specifically, as shown in FIG. 3, when the light guide plate 33 is fixed by using the elastic fixing member 31, the body part 311 of the elastic fixing member 31 can be arranged close to corners of the light guide plate 33. Besides, the self-fixation part 312 of the elastic fixing member 31 can further match a fixing structure (i.e., a first hole structure, invisible in the figure) of the backplane 32, thereby allowing the elastic fixing member 31 to be secured onto the corresponding backplane 32, and further enhancing the fixation effect of the light guide plate 33. As can be easily come up with from FIG. 3, when the elastic fixing member 31 is fixed onto the corresponding backplane 32, the self-fixation part 312 of the elastic fixing member 31 will readily enter the fixing structure of the backplane 32 under the guidance of the mounting guide structure 322 of the backplane 32, thereby achieving fixation of the elastic fixing member 31 per se on the backplane 32.

Figure 4:
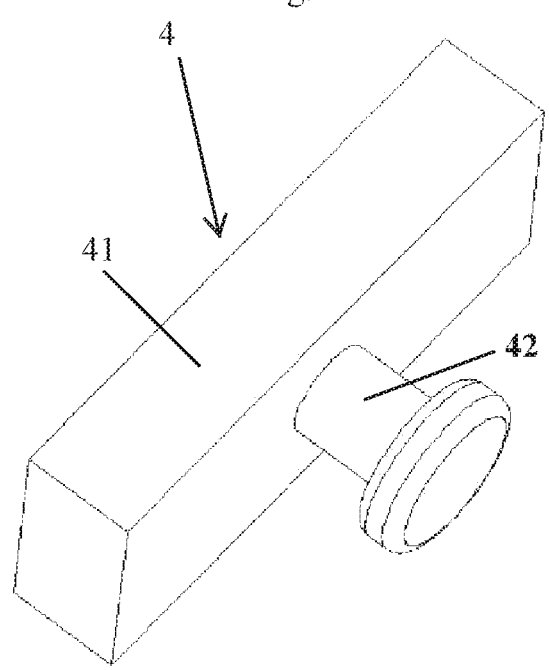
FIG. 4 is a schematic stereo view of an elastic fixing member for fixing a light guide plate according to another embodiment of the present disclosure.
Figure 5:
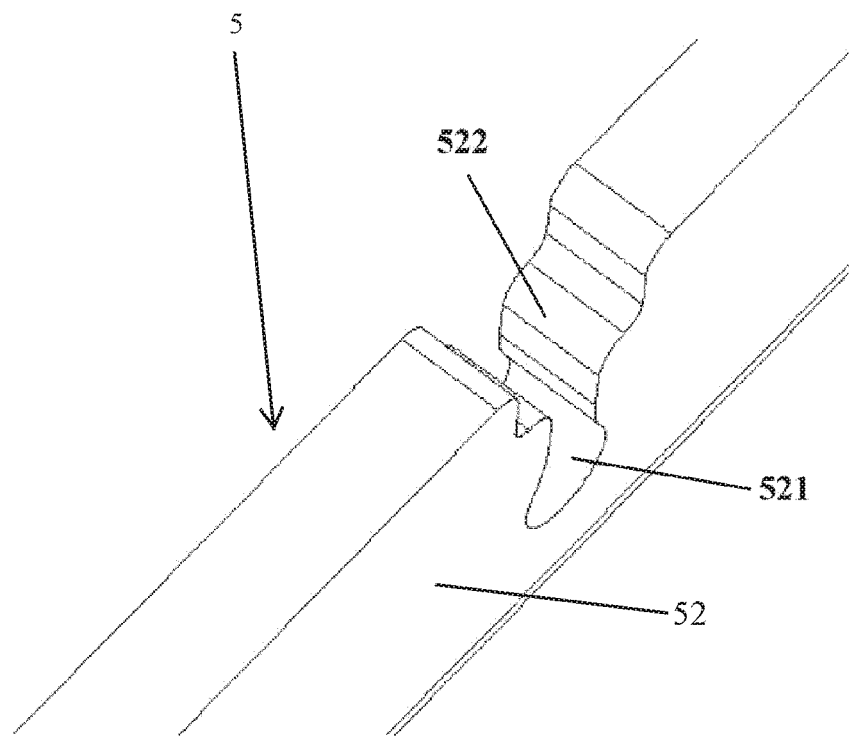
FIG. 5 is a schematic stereo view of a backplane for use in conjunction with the elastic fixing member shown in FIG. 4 according to another embodiment of the present disclosure.
Figure 6:
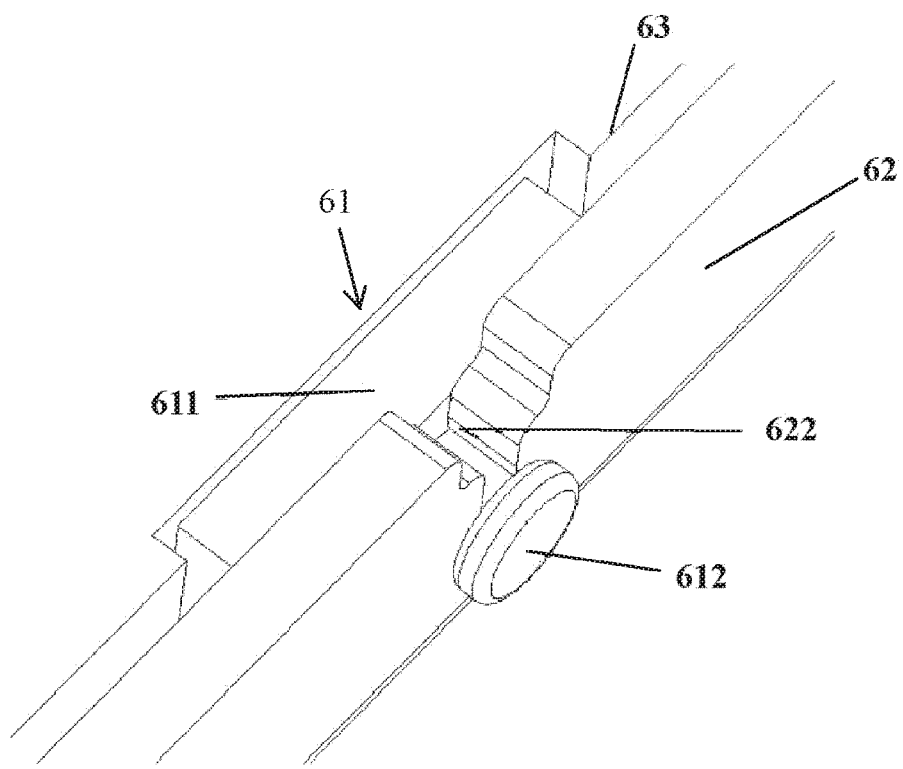
FIG. 6 is a schematic stereo view of the elastic fixing member shown in FIG. 4 and the backplane shown in FIG. 5 after being assembled according to another embodiment of the present disclosure.

Similar to the case as shown in FIGS. 1-3, FIGS. 4-6 show a case in which the body part of the elastic fixing member has a straight shape. Specifically, FIG. 4 is a schematic stereo view of an elastic fixing member for fixing a light guide plate according to another embodiment of the present disclosure, FIG. 5 is a schematic stereo view of a backplane for use in conjunction with the elastic fixing member shown in FIG. 4 according to another embodiment of the present disclosure, and FIG. 6 is a schematic stereo view of the elastic fixing member shown in FIG. 4 and the backplane shown in FIG. 5 after being assembled according to another embodiment of the present disclosure.

In contrast with the curved shape of the elastic fixing member 1 shown in FIG. 1, now in FIG. 4, the elastic fixing member 4 can has a straight shape, e.g., as a straight bar. However, for the self-fixation part 42 of the elastic fixing member 4, the structure thereof is designed in a same manner as the self-fixation part 12 of the elastic fixing member 1 in FIG. 1, which will not be repeated herein for simplicity. Likewise, similar to the case shown in FIG. 2, now in FIG. 5, the backplane 5 for use in conjunction with the elastic fixing member 4 can also have a base (not shown in the figure) and a side wall 52, wherein a fixing structure 521 and a mounting guide structure 522 (i.e., the first hole structure and the second hole structure as mentioned above respectively) can also be provided in the side wall 52. In this case, referring to FIG. 6, when the elastic fixing member 61 is used for fixing the light guide plate 63, the body part 611 of the elastic fixing member 61 can be arranged along a side edge of the light guide plate 63. Besides, the self-fixation part 612 of the elastic fixing member 61 can further match a fixing structure (i.e., a first hole structure, invisible in the figure) of the backplane 62, thereby allowing the elastic fixing member 61 to be secured onto the corresponding backplane 62, and further enhancing the fixation effect of the light guide plate 63.

As a specific optional example, the elastic fixing member can be made of materials such as rubber, for example, highly elastic plastic, pc materials, PC/XQ836619, PC/AC3910, PC/URZ2501 and so on. Moreover, materials for the backplane can be the common SUS, Al5052, SGLC, SGCC or the like. Obviously, as can be easily understood by those skilled in the art, the elastic fixing member and/or backplane as used in embodiments of the present disclosure can also be made of other suitable materials not mentioned above, and the present disclosure is not limited in this aspect.

According to another aspect of the present disclosure, a liquid crystal display device is further provided. The liquid crystal display device can specifically comprises the elastic fixing member described in any of the above embodiments, the corresponding backplane for use in conjunction therewith, and a light guide plate to be fixed. By incorporating the elastic fixing member as described in the above embodiments and the corresponding backplane into the liquid crystal display device, many advantages can be obtained in terms of fixation of the light guide plate, such as anti-aging, anti-knock, easy assembly, batch automation, high accuracy, high reliability and low cost. This can promote a wide application of the light guide plate and further possible backlight module and liquid crystal display device in technical fields such as transportation by vehicle, by sea, by air and so on.

It should be pointed out that, in specific description of the present disclosure, terms indicative of orientation or position such as "center", "up", "down", "front", "back", "left", "right", "vertical", "horizontal", "top", "bottom", "internal" and "external" refer to orientational or positional relations as shown in the drawings. They are only used for simplifying the description of the present disclosure, instead of implying that the devices or elements as involved must has a special orientation, or be constructed and operated in a specific orientation. Therefore, all such terms and terms having equivalent meanings should not be construed as limiting the present disclosure.

It should be further pointed out that in the specific description of the present disclosure, terms such as "first" and "second" are only used for descriptive purposes and should not be construed as implying relative importance or hinting at the number of the indicated technical features.

Therefore, features defined by terms such as "first" and "second" may indicate explicitly or implicitly that one or more such features are comprised. In description of the present disclosure, unless otherwise explained, "multiple" means two or more.

It should be further noted that in description of the present disclosure, unless otherwise prescribed and defined, terms such as "mount", "link" and "connect" should be understood in a broad sense. For example, it can refer to fixed connection, detachable connection, or integrated connection. Similarly, it can refer to direct connection, indirect connection via an intermediate media, or even connection inside two elements. For a person having ordinary skills in the art, specific meanings of the above terms in the present disclosure can be understood upon specific situations.

It should be further pointed out that, in depiction of the present description, specific features, structures, materials or characteristics can be combined in any suitable manner according to any one or more embodiments or examples.

The above description is only directed to specific embodiments of the present disclosure, but the protection scope of the present disclosure is not limited thereto. Any variation or substitution, easily conceivable for a skilled person who is familiar with this technical field within the teaching as disclosed in the present disclosure, shall fall within the protection scope of the present disclosure. Therefore, the protection scope of the present disclosure shall be subject to the protection scope of the following claims.

LIST OF REFERENCE NUMERALS 1 elastic fixing member
11 body part
12 self-fixation part
121 rod
122 cap
2 backplane
21 base
22 side wall
221 fixing structure
222 mounting guide structure
31 elastic fixing member
311 body part
312 self-fixation part
32 backplane
322 mounting guide structure
33 light guide plate
4 elastic fixing member
41 body part
42 self-fixation part
5 backplane
52 side wall
521 fixing structure
522 mounting guide structure
61 elastic fixing member
611 body part
612 self-fixation part
62 backplane
622 mounting guide structure
63 light guide plate

The invention claimed is:

1. A backlight module, comprising: a light guide plate; an elastic fixing member for fixing the light guide plate; and a backplane for use in conjunction with the elastic fixing member, wherein the elastic fixing member comprises a body part and a self-fixation part which are molded integrally, the body part is in a straight shape and arranged along a side edge of the light guide plate in use, the self-fixation part is configured to fix the elastic fixing member on the backplane in use, the self-fixation part comprises a rod and a cap, the cap is arranged at one end of the rod, and at the other end of the rod opposite to the cap, the rod is connected to the body part of the elastic fixing member, wherein the backplane comprises a base and a side wall, a fixing structure and a mounting guide structure are arranged on the side wall of the backplane, the fixing structure is configured to maintain a fixation of the elastic fixing member on the backplane together with the self-fixation part of the elastic fixing member in use, the mounting guide structure is configured to guide the elastic fixing member in use to fix it on the backplane, and wherein the light guide plate is provided with a groove configured to house the body part of the elastic fixing member therein.

2. The backlight module according to claim 1, wherein the elastic fixing member is formed from a rubber material by an injection molding process.

3. The backlight module according to claim 1, wherein the fixing structure comprises a first hole structure penetrating through the side wall of the backplane, and the mounting guide structure comprises a second hole structure penetrating through the side wall of the backplane, wherein the second hole structure is in communication with the first hole structure, and is open at a top of the side wall of the backplane.

4. The backlight module according to claim 3, wherein an aperture of the second hole structure is greater than that of the first hole structure.

5. A liquid crystal display device comprising the backlight module according to claim 1, wherein the backlight module is configured to provide backlight for the liquid crystal display device.

6. The liquid crystal display device according to claim 5, wherein
the elastic fixing member is formed from a rubber material by an injection molding process.

7. The liquid crystal display device according to claim 5, wherein
the fixing structure of the backplane comprises a first hole structure penetrating through the side wall of the backplane, and the mounting guide structure comprises a second hole structure penetrating through the side wall of the backplane, wherein the second hole structure is in communication with the first hole structure, and is open at the top of the side wall of the backplane.

8. The liquid crystal display device according to claim 7, wherein
an aperture of the second hole structure is greater than that of the first hole structure.

9. A backlight module, comprising: a light guide plate; an elastic fixing member for fixing the light guide plate; and a backplane for use in conjunction with the elastic fixing member, wherein the elastic fixing member comprises a body part and a self-fixation part which are molded integrally, the body part is in a curved shape and arranged close to corners of the light guide plate in use, the self-fixation part is configured to fix the elastic fixing member on the backplane in use, the self-fixation part comprises a rod and a cap, the cap is arranged at one end of the rod, and at the other end of the rod opposite to the cap, the rod is connected to the body part of the elastic fixing member, wherein the backplane comprises a base and a side wall, a fixing structure and a mounting guide structure are arranged on the side wall of the backplane, the fixing structure is configured to maintain a fixation of the elastic fixing member on the backplane together with the self-fixation part of the elastic fixing member in use, the mounting guide structure is configured to guide the elastic fixing member in use to fix it on the backplane, and wherein the light guide plate is provided with a groove configured to house the body part of the elastic fixing member therein.

\* \* \* \* \*